United States Patent [19]
Kurz, Jr.

[11] 3,815,976
[45] June 11, 1974

[54] DAY/NIGHT REARVIEW MIRROR

[75] Inventor: Arthur W. Kurz, Jr., Birmingham, Mich.

[73] Assignee: Donnelly Mirrors, Inc., Holland, Mich.

[22] Filed: Dec. 13, 1972

[21] Appl. No.: 314,860

[52] U.S. Cl.................................. 350/280, 350/289
[51] Int. Cl. ........ B60r 1/04, B60r 1/06, G02b 7/18
[58] Field of Search .............................. 350/278-283

[56] References Cited
UNITED STATES PATENTS

| | | | |
|---|---|---|---|
| 1,768,354 | 6/1930 | Falge | 350/283 |
| 2,311,400 | 2/1943 | Landell | 350/278 |
| 3,337,286 | 8/1967 | Wieszeck | 350/283 |
| 3,588,231 | 6/1971 | Platzer | 350/279 |
| 3,722,984 | 3/1973 | Brean | 350/280 |

FOREIGN PATENTS OR APPLICATIONS

| | | | |
|---|---|---|---|
| 619,360 | 3/1949 | Great Britain | 350/278 |

*Primary Examiner*—John K. Corbin
*Attorney, Agent, or Firm*—Price, Heneveld, Huizenga & Cooper

[57] ABSTRACT

A day/night, anti-glare, rearview mirror assembly especially adapted for external mounting on vehicles such as automobiles. The mirror assembly is characterized by two mirrors having reflective coatings covering at least a portion of their surfaces, one mirror being stationary and including at least one transparent area, the second mirror movably mounted behind the first mirror and including at least one reflective area selectively registrable with the transparent area via the movement of the second mirror. Registry of the reflective area of the movable mirror with the transparent area of the stationary mirror provides a fully reflective surface for daytime use, whereas moving the reflective area out of registry provides glare-reducing or nonreflective areas for nighttime use. Means controllable from the driver's position within the vehicle are included for actuating the movement of the second mirror.

21 Claims, 18 Drawing Figures

PATENTED JUN 11 1974 3,815,976

DAY/NIGHT REARVIEW MIRROR

This invention relates to rearview mirrors for vehicles, and, more particularly, to a day/night rearview mirror for vehicles in which a mirrored surface is moved relative to another mirrored surface to provide a full reflective surface for daytime use and a partially reflective surface for the reduction of glare for nighttime use.

BACKGROUND OF THE INVENTION

The problem of glare accompanying the use of mirrors has constantly plagued the automobile industry. Such glare is especially acute and bothersome at night when the driver of a vehicle attempts to use his various driving mirrors providing a view to the rear of his own vehicle. Thus, headlights from other vehicles, streets lights, signs, and the like constantly reduce the ability of the driver to effectively use his rearview mirrors during periods of darkness.

Countless mirrors have been developed to overcome this problem. The widely used prismatic mirror mounted on the interior of the passenger compartment of a vehicle is one such design. However, for various reasons, including the relative expense of such mirrors, as well as their susceptibility to the effects of the elements, such mirrors have been ineffective when mounted on the exterior of vehicles. Other designs have been tried for anti-glare exterior mirrors but with relatively little success. Consequently, the provision of a simply designed effective, antiglare, day/night exterior mirror has been a major problem in the industry.

The present invention was conceived and invented in recognition of and as an answer to the problem of an effective anti-glare, day/night rearview mirror.

SUMMARY OF THE INVENTION

It is, therefore, a purpose of this invention to provide an anti-glare, day/night rearview mirror for vehicles wherein anti-glare, reduced-reflectivity mirror areas are provided for night operation and fully reflective, total mirror areas are provided for day operation, the mirror assembly being selectively interchangeable between these positions by a simple movement of one mirrored surface relative to another. A related purpose of the invention is to provide an anti-glare, day/night mirror which is remotely controllable from the driver's area within the vehicle for selection of either the day or night position, as well as a mirror which is durable and will resist the effects of all types of weather encountered during year-round driving.

In the preferred embodiment, the invention provides a mirror assembly including a first mirror having a reflective coating on its back or second surface in combination with a second mirror having a reflective coating on its front or first surface. The second mirror is slidably mounted behind the stationary first mirror such that the reflective surfaces of the two mirrors are parallel to and immediately adjacent one another. The essence of the invention lies in providing at least one transparent area within the silvered surface of the first mirror and selectively registering with that transparent area either a correspondingly shaped and sized reduced-reflectivity area included on the second mirror, or a silvered area forming the remainder of the second mirror. Thus, rays of light to be reflected by the mirror assembly will pass through the transparent areas in the stationary mirror and, depending on whether the day or night position is selected, i.e., whether the silvered or reduced-reflectivity areas on the movable mirror are selected, the incident light rays will either be reflected or absorbed, respectively. Consequently, the mirror assembly can be provided with a reflective surface covering its entire area in the day position or a reflective surface covering only selected portions of its area, with the remaining portions including light-absorbing or reduced-activity areas, in the night position.

In one form of the invention, the registrable transparent and reduced reflectivity areas are provided in a broad, horizontal strip across the center of an externally mounted rearview mirror assembly secured adjacent the driver's position on the door or fender of an automobile. When properly adjusted, the broad horizontal strip across the mirror is positioned such that all of the rays of light from headlights of vehicles to the rear of the overtaking or passing the subject vehicle will strike the mirror on the reduced reflectivity horizontal strip, the glare thereby being reduced according to the type of reduced-reflectivity surface provided thereon. During the day, however, the movable mirror is shifted to register a correspondingly shaped, silvered area with the transparent area thereby forming a full reflective area. The fully silvered area provides a fully visible image similar in all respects to that provided by a normal, single-surface, mirrored area.

In other forms of the invention, alternating reduced reflectivity and normally reflective or silvered horizontal strips covering the entirety of the movable first-surface mirror are brought into registry with alternating transparent and reflective or silvered horizontal strips spaced over the entire surface of the stationary, second-surface mirror. In another form of the invention, regularly spaced, circular, reduced-reflectivity dots are positioned over the silvered surface of the movable mirror to be brought into registry with correspondingly shaped and sized transparent dots formed in the silvered surface of the stationary mirror. Thus, depending upon the amount of the area covered by either the reduced-reflectivity strips or the spaced dots, and the quality of or percentage of incident light reflected by the normally reflective areas, the overall light reflectivity of the mirror assembly in the night position may be predetermined at a specified value.

In certain of the various embodiments and forms of the invention, the movable mirror positioned behind the stationary mirror need be only shifted or slid a small amount to provide the necessary change from day to night position or vice versa. In other forms of the invention, the second mirror is pivoted via hinge or lever mounts, or slide on angled tracks into and out of registry with the transparent areas of the first mirror such that the reflective coatings on the two mirrors do not contact one another during movement. In all of the various embodiments, the shift of the second mirror may be accomplished with various remote control means controllable from the interior of the vehicle on which the mirror assembly is mounted including flexible cable means, camming means, electrical solenoid means, or electric motor and gear means.

The present invention, therefore, provides a simply constructed, durable, rearview mirror assembly wherein a movable mirror is shifted relative to another, stationary mirror in order either to bring reduced reflectivity areas included on the movable mirror into registry with transparent areas on the stationary mirror or to provide reduced reflectivity areas behind the transparent areas. The assembly thus provides selectively either a full reflective surface mirror or a mirror having predetermined, preselected areas of an antiglare, reduced-reflectivity nature which effectively prevent glare which would otherwise hinder and obstruct the use of the mirror assembly.

These and other objects, advantages, purposes and features of the invention will become more apparent from a study of the following description taken in conjunction with the drawings.

DESCRIPTION OF THE PREFERRED EMBODIMENTS

Figure 1:
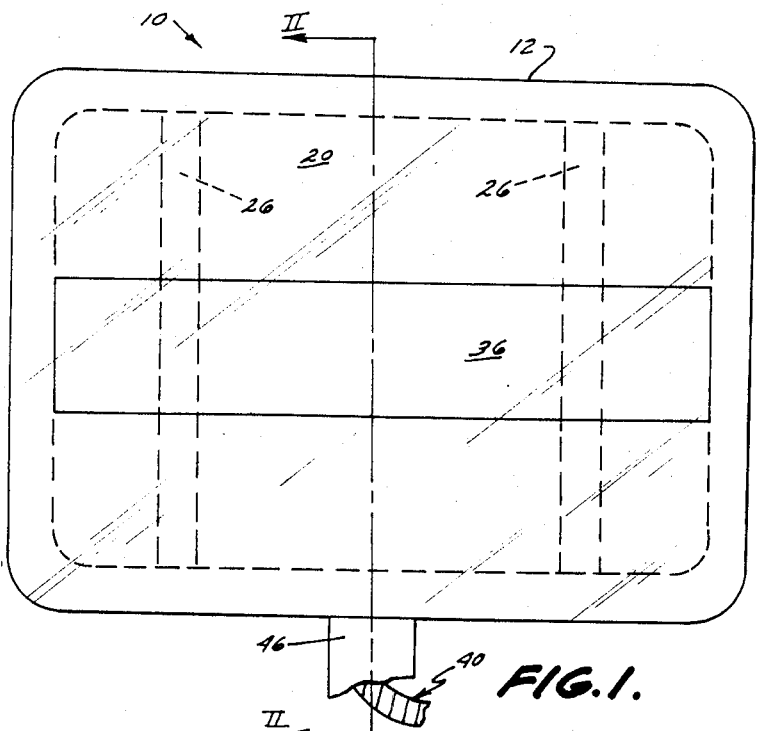
FIG. 1 is a fragmentary, front elevational view of one form of a day/night, anti-glare, rearview mirror embodying the present invention, shown in the day position and including push-pull cable control means for moving one mirror surface relative to the other.
Figure 2:
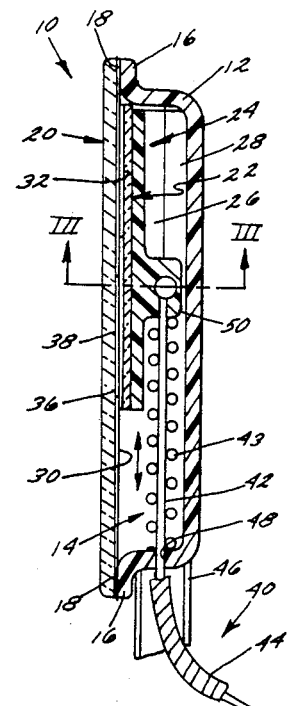
FIG. 2 is a fragmentary, cross-sectional, side elevation of the mirror of FIG. 1 taken along the plane II—II thereof.
Figure 3:
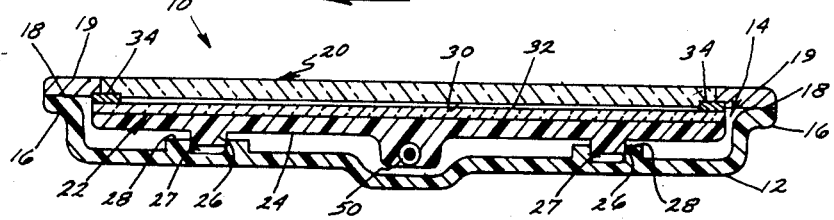
FIG. 3 is a cross-sectional, bottom plan view of the mirror shown in FIGS. 1 and 2 taken along plane III—III of FIG. 2.
Figure 15:
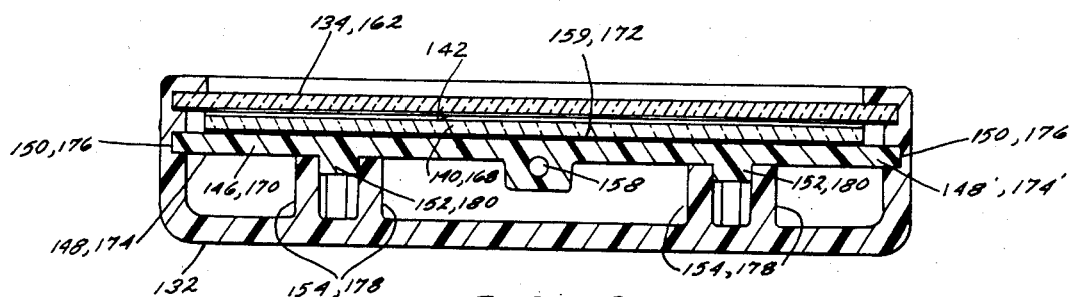
FIG. 15 is a cross-sectional, plan view of either of the mirror assemblies shown in FIGS. 13 and 14 taken along planes XV-XV thereof.
Figure 10:
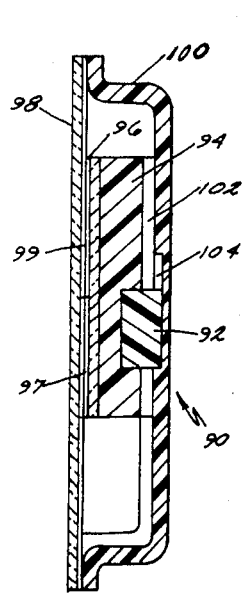
FIG. 10 is a cross-sectional, side elevation of the embodiment of the invention shown in FIG. 9.
Figure 13:
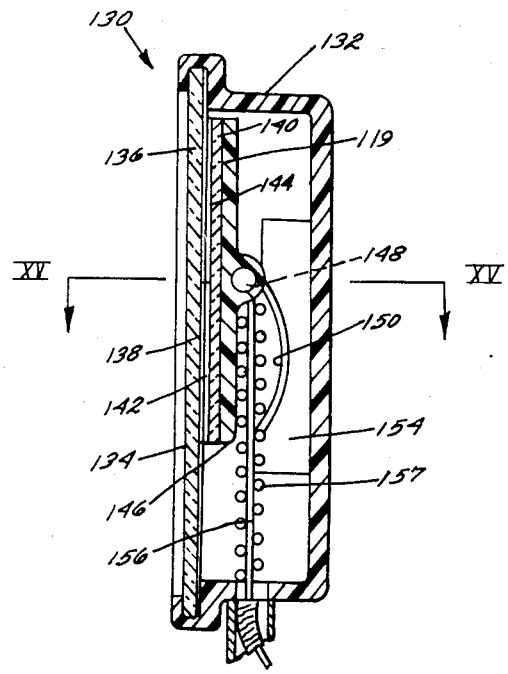
FIG. 13 is a fragmentary, cross-sectional, side elevation of another form of the present invention including a curved camming track for guiding the movement of the movable second mirror.
Figure 14:
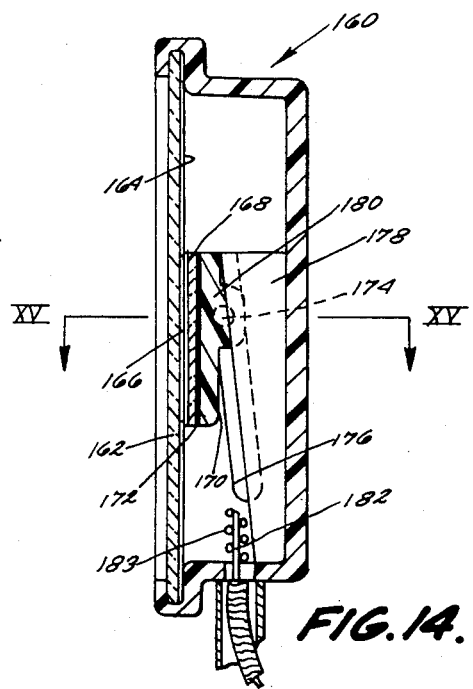
FIG. 14 is a fragmentary, cross-sectional, side elevation of another form of the present invention similar to that shown in FIG. 13 but including a slanted, rectilinear camming track rather than a curved camming track.

Referring now to the drawings in greater detail, FIGS. 1-3 show an anti-glare, day/night, rearview mirror assembly 10 embodying the present invention and intended to be mounted externally of a vehicle on a front fender or door thereof to enable the driver of the vehicle to view areas along the side of and to the rear of the vehicle. The unit or assembly 10 includes a housing or cover 12 including an opening 14 which faces generally rearwardly when the mirror assembly is mounted on the vehicle. The housing 12 includes a peripheral lip or flange 16 extending around the opening 14 and providing a generally planar surface 18 to which a stationary, second reflective-surface mirror 20 may be securely bonded or otherwise affixed or adhered. Mirror 20 may be secured directly to the surface 18 or via a frame 19 of strips of other materials which are secured between the edges of the mirror 20 and the surface 18, as shown in FIG. 3. The housing may also be molded or formed around the edge of the stationary mirror as shown in FIGS. 13-15. Mirror 20 therefore generally closes and seals the opening 14 of housing 12 thereby protecting the interior of the housing from water, dust, dirt, and the like.

Slidably mounted behind the stationary, second reflective-surface mirror 20 is a movable, first reflective-surface mirror 22. Mirror 22 is bonded or otherwise adhered to a backing plate or support 24. Support 24 includes raised strips or runners 26 integrally formed on the back thereof and corresponding in shape to channels 28 formed integrally on the interior of the back portion of housing 12. Runners 26 and channels 28 extend vertically within the housing such that the combined back support plate 24 and first reflective surface movable mirror 22 may be shifted in combination up or down therealong. A leaf spring 27 is included between runners 26 and channels 28 (FIG. 3) in order to bias the support 24 and mirror 22 toward the rear surface of mirror 20. As will be explained below, wear strips 34 or an anti-friction coating over all or a portion of the rear surface of mirror 20 prevent the direct contact of the two mirror surfaces, but allow them to be as closely adjacent one another as is possible.

As mentioned above, stationary mirror 20 has a predetermined patterned reflective surface 30 located on its back or second surface, i.e., the surface which is farthest away from the source of light rays which are incident thereon. On the other hand, movable mirror 22 has its reflective surface 32 coated or provided on its front or first surface. Therefore, when mirrors 20 and 22 are mounted as described above and as shown in FIGS. 1-3, the reflective surfaces 30 and 32 on the respective mirrors are parallel and immediately adjacent one another. In order to prevent the reflective surfaces from wearing against one another as the mirror 22 is moved relative to the mirror 20, two nylon wear strips 34 are located between the two mirrors in order to space the silvered or reflective surfaces slightly away from one another thereby preventing contact and friction which would otherwise wear the silvered surfaces away. Alternatively, as will be more fully described below, a thin coating of silicone or another similar transparent lubricating material may be placed over one or the other of the reflective surfaces 30 or 32 thereby obviating the need for the additional wear strips 34. Other means of moving the movable, second mirror may be provided to prevent the scratching or abrasion of the reflective surfaces as will be discussed below.

In accordance with one objective of the invention, the reflective surface 30 of the stationary mirror 20 includes a wide, horizontal transparent strip area 36 extending centrally across the entirety of the width of the mirror assembly 10. Also, the movable mirror 22 includes a correspondingly shaped and sized horizontal strip 38 of reduced reflectivity along the silvered areas 32 thereof. The reduced reflectivity area, formed by painting, coating, or otherwise covering the surface of the mirror 22 in area 38 with black paint or another dark, anti-glare coating such as black tape is of sufficient size to completely cover the transparent area 36 when aligned and in registry therewith. Similarly, the highly reflective remaining area 32 on movable mirror 22 is of sufficient size to also completely cover the transparent area 36 when aligned and in registry therewith. Consequently, slidably movable mirror 22 is shiftable such that either the highly reflective area 32 or the reduced reflectivity area 38 is in registry with the transparent area 36 on stationary mirror 20. Thus, the assembly 10 provides either a highly reflective surface wherein the entire surface of the mirror assembly, when viewed from mirror 20, is highly reflective, or alternatively, a partially reflective surface wherein a wide, horizontal, reduced-reflectivity strip 38 is visible through the transparent area 36. Thus, the mirror assembly 10 may be shifted between a day position, i.e., wherein the entire surface has a highly reflective surface since the highly reflective surface 32 is visible through transparent area 36, or a night position, i.e., wherein the reduced reflectivity area 38 is visible through transparent area 36 between two highly reflective areas 30.

In this connection, a control means 40 is provided for sliding the movable mirror 22 between its day and night positions. Control means 40 comprise a flexible remote control cable having an inner, flexible, pull cable 42 sheathed in an outer protective, flexible cable 44. The cable 40 is inserted into the bottom of the housing 12 through a hollow mirror support 46 and an aperture 48 in the housing 12. The inner pull cable 42 is connected to the backing support 24 of movable mirror 22 by means of a ball connector 50. A spring or other biasing means 43 is positioned around cable 42 between the bottom of housing 12 and the projection in which connector 50 is located (FIG. 3). Thus, support 24 is biased upwardly in FIG. 3 and cable 42 need only be pulled to change the position of the support. The support automatically returns to its up position when the cable is released or unlocked. Consequently, the cable need not be stiff to allow the support to be pushed therewith. This allows flexible cables which may be bent through small radius curves and passed through confined areas to be effectively used in connection with the mirror assembly. The controlling end of the flexible remote cable 40 (not shown) is affixed adjacent the driver of the vehicle on the interior thereof. Thus, the control means is conveniently located such that the driver may quickly and easily actuate the cable 40 in order to selectively slidably move the mirror 22 into either its night or day positions.

Figure 4:
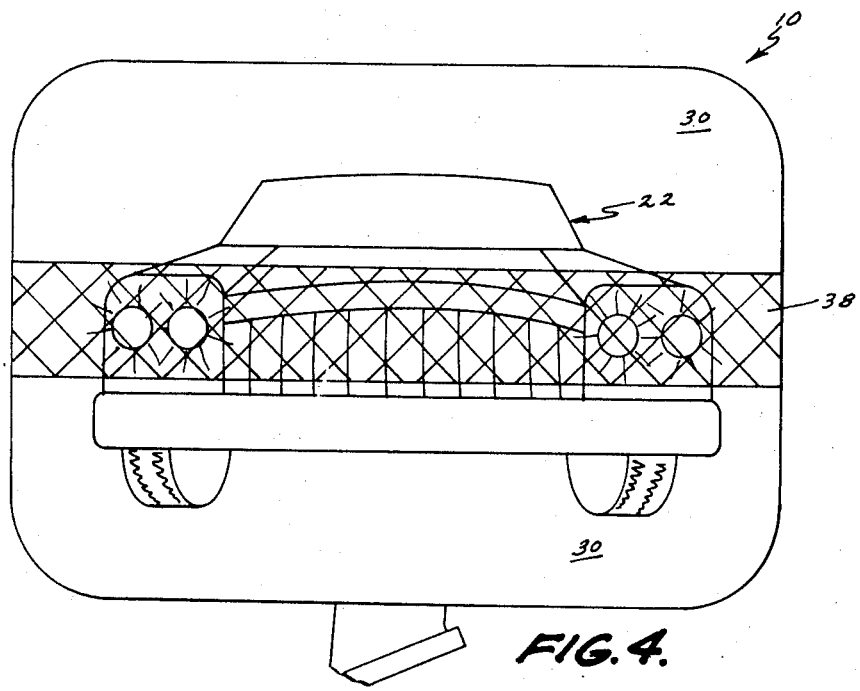
FIG. 4 is a front elevational view of the mirror of FIG. 1 shown in the night position.

As shown in FIG. 4, when properly mounted on the exterior of a vehicle and properly adjusted, the rearview assembly 10 shown in FIGS. 1-3 and shifted into its night position will provide a broad horizontal strip or reduced-reflectivity area in the center of the mirror in a location which reduces the glare from the headlights of all vehicles to the rear of and passing the subject vehicle. Thus, the images of such other vehicles, represented at 52 in FIG. 4, will appear in the mirror assembly 10 with the headlights falling in the reduced reflectivity strip 38. Rays of light from headlights from other vehicles generally strike the mirror assembly 10 in the center of the mirror along the horizontal strip 38 thereby effectively reducing the glare from those lights substantially at all times.

Figure 5:
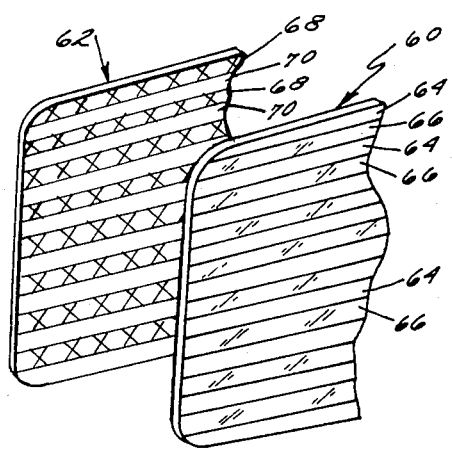
FIG. 5 is a fragmentary, perspective view of the two mirror surfaces included in another form of the present invention.
Figures 6, 7:
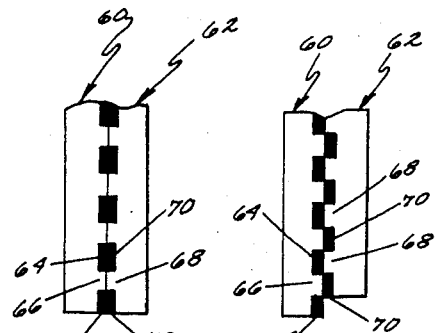
FIG. 6 is an enlarged, fragmentary, side elevation of the mirror surfaces shown in FIG. 5 shown in the night position.
FIG. 7 is an enlarged, fragmentary, side elevation of the mirror surfaces shown in FIGS. 5 and 6 shown in the day position.

Referring now to FIGS. 5 through 7, another form of the invention is shown including a stationary, second reflective-surface mirror 60 and a slidably movable, first reflective-surface mirror 62. Stationary mirror 60 includes a plurality of alternating horizontal highly reflective strips 64 and horizontal transparent areas 66 formed between the silvered areas. Movable mirror 62 includes a plurality of reduced-reflectivity horizontal strips 68 alternating with a like number of horizontal reflective strips 70 therebetween. The number of reduced-reflectivity strips 68 and reflective strips 70 on mirror 62 are both equal to the number of transparent horizontal strips 66 on mirror 60. As mentioned above in connection with mirror assembly 10, the size and shape of both strips 68 and 70 substantially correspond with the size and shape of transparent areas or strips 66 such that either strip 68 or 70 may be brought into registry and aligned with transparent area 66.

As shown in FIGS. 6 and 7, slidably movable mirror 62 may be shifted slightly with respect to stationary mirror 60 in order to selectively bring either the reduced reflectivity strips 68 or highly reflective strips 70 into registry with the transparent areas 66 thereby selectively changing the mirror assembly from its day to night position and vice versa. Only a slight shift of the movable mirror surface 62 is necessary to bring either the reduced reflectivity strips 68 or highly reflective strips 70 into registry with the transparent strips 66, the distance of the shift being equivalent to the width of the reduced-reflectivity strips 68 or the transparent strip 66. In this respect, it will be understood that the alternating strips on each mirror are as thin or small as is practically possible. The thinner the strips, the more homogenous or uniform the entire surface appears to be. Thus, when the reduced-reflectivity strips are in registry with the transparent strips, i.e., in the night position, and the alternating strips are each very thin, the human eye will not differentiate between the strips and the entire surface will appear to be coated with a uniform, reduced-reflectivity coating. In the preferred embodiment, the alternating highly reflective and transparent strips 64 and 66, respectively, will each have a width within the range of approximately one sixty-fourth to one thirty-second of an inch, although strips having widths in the approximate range of between 0.010 and 0.125 inches may be used.

As shown in FIGS. 5 through 7, the width of the respective strips may be equal thereby causing a 50 per cent reduction in the reflectivity of the mirror assembly when the reduced-reflectivity strips 68 are brought into registry with the transparent areas 64. This is assuming that the reduced-reflectivity strips reflect no light at all. As will be understood by those skilled in the art, the ratio of the widths of the highly reflective strips to the transparent strips, and thus the reduced-reflectivity strips, may be varied according to the desired amount of reduction in the reflective surface area. That is, when the highly reflective strips 64 are twice the width of the transparent strips 66, the total reflective surface will be two-thirds of the entire surface whereas the reduced-reflectivity area will be one-third of the entire surface. Thus, the mirror assembly in its night position will reflect only two-thirds the amount of light the assembly would reflect in its day position. Similarly, if the transparent areas and the reduced-reflectivity strips were twice the width of the highly reflective strips 64, then the mirror assembly in its night position would reflect only one-third the amount of light it would reflect in its day position. Consequently, the amount of reflectivity in the night position is easily calculated by taking the ratio of the width of the transparent or reduced-reflectivity strips to the width of the entire surface area of the mirror.

An alternative method of modifying the reflectivity of the mirror assembly in both the day and night positions is to provide different quality reflective coatings on the various areas of the first and second mirrors. As will be understood by those skilled in the art, a reflective coating quality may be provided such that the coating reflects a certain percentage of light incident thereon. This percentage may be varied within the range of 0–100 per cent. Consequently, in the embodiment of the invention shown in FIGS. 5–7, if the highly reflective strips 64 reflect 100 per cent of the incident light, the reflective strips 70 reflect 50 per cent of the incident light, and the reduced-reflectivity strips 68 reflect 0 per cent or no incident light (all of the strips being equivalent in size or width) the total reflectivity of the mirror in the day position is the average of 100 per cent and 50 per cent or 75 per cent, and the total reflectivity in the night position is the average of 100 per cent and 0 per cent or 50 per cent. Thus, the total reflectivity of the mirror assembly will be dependent on two variables, the size or width of the alternating horizontal strips and the quality of the reflective coatings on the various areas of the two mirrored surfaces. By changing one or both of these two variables, the reflectivity of the assembly in both day and night positions may be varied as desired.

Figure 8:
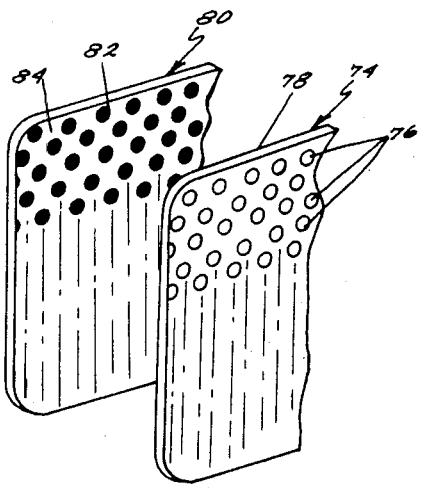
FIG. 8 is a fragmentary, perspective view of the mirror surfaces included in a third form of the present invention.

As shown in FIG. 8, yet another form of the day/night, anti-glare, mirror assembly may be provided by forming transparent dots 76 regularly spaced over the entire surface of the highly reflective second surface 78 of a stationary mirror 74. A plurality or reduced reflectivity dots 82 similar in number, size, and shape to the transparent dots 76 are located at substantially corresponding areas of the highly reflective, first reflective surface 84 of a movable mirror 80. As with the mirrors 60 and 62 shown in FIGS. 5–7, a slight shift of mirror 80 with respect to mirror 74 will selectively bring either the reduced-reflectivity dots 82 or the highly reflective areas 84 of mirror 80 into registry with the transparent dots 76. Thus, a small shift in mirror 80 will change the mirror assembly including mirrors 74 and 80 from its day to night position and vice versa. Further, the reduction in reflectivity in the mirror assembly in its night position may be predetermined in a manner similar to that described above by varying the ratio of the total area of the transparent dots to the total surface area of the mirror 74 or by varying the quality of the reflective coatings on the mirrors 74 and 80. As with the embodiment described above using the horizontal, alternating strips, the form using the spaced dots is preferably provided with as small dots as possible. This provides a more uniform, homogenous-appearing reflective surface. In the preferred embodiment, the mirrors shown in FIG. 8 will have transparent and reduced-reflectivity dots 76 and 82, respectively, having a diameter in the range of between one sixty-fourth and one-sixteenth of an inch, although larger or smaller dots may be used without deviating from the spirit of the invention.

In all of the mirror assemblies described above, the highly reflective surfaces of the two mirrors are kept as close as possible to one another without actually being in contact. The proximity of the highly reflective surfaces is important in order to present, as nearly as possible, a planar reflective surface which thereby reduces the optical distortion, stray reflection or refraction of the mirror assembly to a minimum. Thus, as described in mirror assembly 10 above, the mirrored surfaces are parallel and adjacent one another and separated only by either the nylon wear strips or a thin transparent coating of silicone. It is important to note that the silicone or other lubricious transparent coating should be coated over only the back of the silvered areas on the stationary mirror or the surfaces of the reduced-reflectivity strips on the movable mirror. Restricting the protecting, lubricating coating to these areas prevents any undesirable stray reflection from being caused by this coating.

Additionally, as mentioned above, the reduced-reflectivity areas on all the mirror assemblies described herein are formed by coating the desired areas with black or other light-absorbing paint. As will be understood by those skilled in the art, other ways are possible to provide the reduced-reflectivity areas, such as forming transparent areas in the movable mirror and placing a light-absorbing surface such as black velvet behind the movable mirror or coating the inside of the housing with a dark-light absorbing layer. Thus, when the mirror is in its night position, incident light rays would pass through the transparent areas of both the stationary and movable mirrors and be absorbed by the light-absorbing layer therebehind. However, light-absorbing layers such as black paint coating on the reflective surface of the movable mirror are preferable, especially from an economic standpoint.

Figure 9:
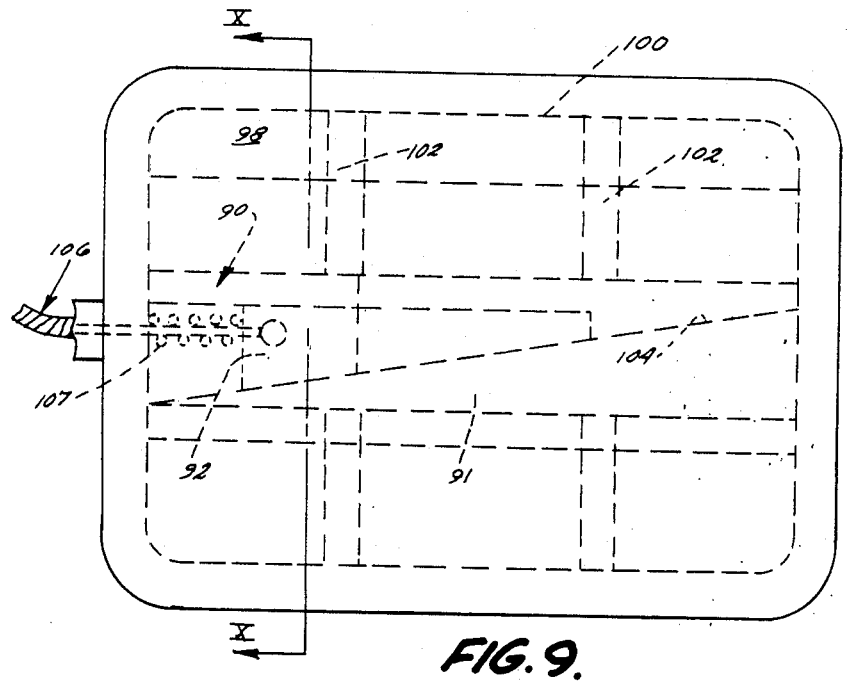
FIG. 9 is a front elevational view of one form of the mirror assembly embodying the present invention including wedge-shaped camming control means for shifting one mirror surface relative to the other.

Referring now to FIGS. 9–12, several other means for controlling the selective shift of the movable mirrored surface with respect to the stationary mirrored surface are shown. FIG. 9 shows a sliding camming means 90 including a wedge-shaped camming block 92. Camming block 92 is rigidly secured to the backing support 94 of a first reflective-surface movable mirror 96 slidably mounted behind a second reflective-surface stationary mirror 98 sealingly closing the opening of a housing 100. As described in connection with the mirror assembly 10, the backing support 94 includes runners 102 extending vertically on the back side thereof adjacent the back of the housing 100 and cooperating with channels formed on the interior of the back of the housing 100. The combined mirror 96 and backing support 94 are thus slidably mounted and may be shifted by the lateral, transverse sliding movement of the wedge-shaped camming block 92 along the inclined surface 104 formed on the interior of the back of the housing 100. A flexible pull cable means 106 and spring or biasing means 107 is provided for this purpose. Spring 107 biases the block 92 such that mirror 96 is biased automatically into its upper position. Cable 106 need only be pulled to change the position of the mirror. Of course, the biasing means and/or reflective areas on mirror 96 may be arranged as desired to allow mirror 96 to be biased into either the day or night position. Thus, by a shift of the camming block 92 with cable means 106 from within the vehicle, the movable mirror 96 is slid transverse to the direction of movement of the camming block in order to bring the reduced-reflectivity area or areas 97 into registry with the transparent area or areas 99 on the stationary mirror.

Figure 11:
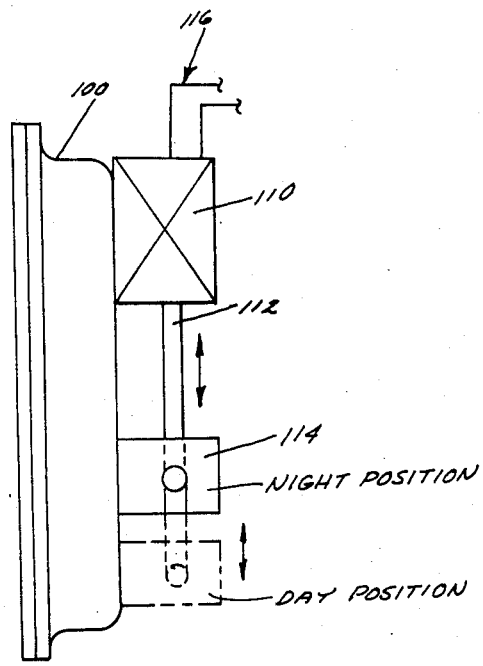
FIG. 11 is a side elevation of another form of the invention including an electric solenoid control means for shifting one mirror surface relative to another.
Figure 12:
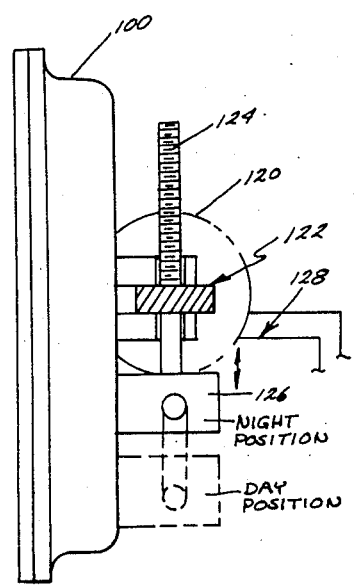
FIG. 12 is a side elevation of another form of the invention including an electric motor and gear means for shifting one mirror surface relative to the other.

Other remote control means for shifting the movable mirror with respect to the stationary mirror may be provided as shown in FIGS. 11 and 12. As is schematically shown in FIG. 11, an electric solenoid 110 may be secured to the outside of the housing 100 and connected via an extensible shaft 112 to an extension 114 of the backing support 94. The solenoid 110 may be controlled via a remotely located electrical switch means (not shown) via wires 116, the switch means being located within the vehicle and accessible from the driver's position. Actuation of the switch means energizes the solenoid 110 to cause a shift of the shaft 112 thereby moving the extension 114 and thus the movable mirror within the housing 110 between its night and day positions, as indicated in FIG. 11.

FIG. 12 depicts another remotely controllable arrangement for shifting the position of the movable mirror in housing 100. In this arrangement, an electric motor 120 is threadably engaged via a worm gear or other gear means 122 through a threaded shaft 124 to an extension 126 from the backing support of the movable mirror within housing 100. As above, the electric motor 120 may be actuated via wires 128 and a switch means (not shown) from within the interior of the car at the driver's position in order to shift the position of the movable mirror from its day-to-night positions or vice versa as indicated in FIG. 12.

Referring now to FIGS. 13–18, several additional embodiments of the novel mirror assembly are shown. Generally, FIGS. 13–18 depict embodiments of the invention wherein the second or movable mirror is mounted such that it moves between at least two positions along paths which insure that the reflective coatings will not come into abrasive contact during the movement thereof. Therefore, abrasion or scratching of the adjacent reflective surfaces is avoided.

FIG. 13 shows a mirror assembly 130 including a housing 132 and a stationary first mirror 134 closing the frontal opening of the housing. The first mirror includes a reflective coating 136 on its second or rear surface, which coating includes a central transparent strip 138 similar to that shown in FIGS. 1–4. A second mirror element 140 is movably mounted behind the stationary mirror 134 such that it can be moved in an arcuate path as will be described hereinafter. Second mirror 140 includes a reflective coating or layer 142 on its first or front surface, the reflective coating being confined to an area covering the lower half of the second mirror while a reduced-reflectivity or non-reflecting coating 144 covers the remaining or upper half of the mirror. Second mirror 140 is secured to a mirror-retaining member 146 formed from metallic, plastic or other materials which includes integral, projecting axles or studs 148 and 148'. These studs are received in arcuate cam tracks or recesses 150 and 150' molded integrally in the sides of the housing 132. Integral runners or projections 152 are formed on the back of the mirror-retaining member 146 and are received between channels or guides 154 formed integrally or secured on the inside of the housing 132. A remote control flexible pull cable 156, including spring 157, is secured to the back of the mirror retaining member 146 at 148 in order to provide an actuator for movement of the second mirror from within the passenger compartment of the vehicle on which the mirror assembly 130 is mounted. The spring 157 biases the mirror 140 into one position as described above in the other embodiments of the assembly. A resilient member 159, formed from rubber or another similar material, may be secured between the second mirror 140 and the mirror-retaining element 146 to provide a pressure pad insuring a uniform, flat fit of the second mirror 140 against the rear surface of the first or stationary mirror 134. Thus, use of pad 159 provides a tight, flat fit even though the mirror-retaining member 146 may not be exactly parallel to the rear surface of mirror 134.

As will now be understood, movement of the cable 156 will cause the mirror-retaining member 146 to follow the arcuate path defined by the recesses 150 such that the reflective area and reduced-reflectivity areas 142 and 144, respectively, may be selectively brought into registry with the transparent strip 138 on the first mirror 134. Runners or projections 152 sliding in guides 154 guide the movement of the mirror-retaining member 146 such that the areas 142 and 144 are properly aligned with the transparent area 138. Thus, it will be understood that the movement of the mirror-retaining member 146 is away from and toward the back of the stationary mirror 134 at either end of its arcuate path whereby the second mirror 140 is brought flat against the rear surface of the first mirror 134 at the upper and lower ends of the recesses 150. Consequently, the areas 142 and 144 will be moved into and out of registry with transparent area 138 without any contact between the adjacent reflective coatings on the first and second mirrors during the movement between the registering positions.

FIG. 14 depicts another embodiment of the present invention similar to that shown in FIG. 13 but including a modification in the configuration of the cam tracks which the movable second mirror follows. Thus, the embodiment 160 of the mirror assembly includes a first mirror 162 having a reflective coating 164 including a transparent central area 166. A second mirror 168, which is large enough only to cover the transparent area 166 is secured to a mirror-retaining member 170 via an intermediate rubber pressure pad 172. Retaining member 170 also includes projecting axles or studs 174 and 174' which are received in slanted, rectilinear cam tracks or recesses 176 formed in the sides of the mirror housing. Guide channels 178 are molded on the back of the housing and guide projections 180 included on the mirror-retaining member 170. A flexible pull cable 182, including spring 183, is included to move the second mirror along the path defined by the rectilinear recesses 176. As above, the spring 183 automatically biases the mirror 168 into its registering or day position. The cross-sectional, plan view of mirror assembly 160 is substantially the same as that for assembly 130 as shown in FIG. 15. Thus, when the cable 182 is moved, the mirror-retaining element 170 will follow the recesses 176 thereby moving the second mirror 168 downwardly and away from the reflective coating on the back of the first mirror 162 such that the second mirror is moved out of registry with transparent area 166. Consequently, when the second mirror is moved out of such registry, the person viewing the front of the assembly 160 will be able to view directly through the transparent area. In this connection, the interior of the housing is coated with a dark, nonreflective, dull layer or coating which absorbs light rays passing through the transparent area. The transparent area is therefore a reduced-reflectivity area as described in FIGS. 1–4 since the only light reflected will be that from the surfaces of the glass or other transparent material in the transparent area. Therefore, with either embodiment 130 or 160, a central reduced-reflectivity area or strip is provided for nighttime driving by selective movement of the second mirror away from the reflective coatings on the rear of the first mirror in a manner which avoids scratching or abrasion thereof.

Figure 16:
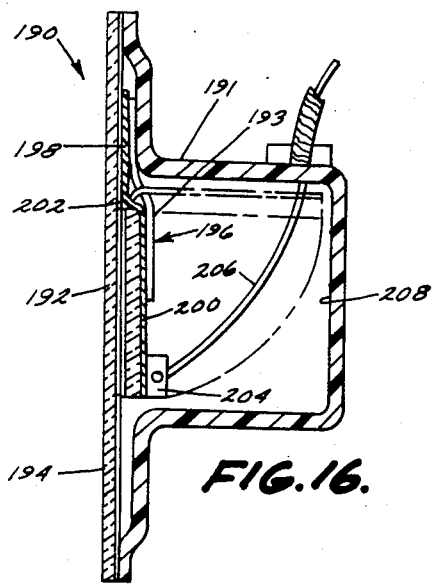
FIG. 16 is a fragmentary, cross-sectional, side elevation of still another form of the present invention, the second, movable mirror being hingedly secured behind the stationary, first mirror.

FIG. 16 depicts still another embodiment 190 of the mirror assembly wherein the second mirror 192 is moved out of registry with a transparent central strip provided in the first mirror 194 via a mirror-retaining hinge member 196. The hinge member may be any type of hinge element which enables the second mirror to be pivoted away from the rear surface of the stationary mirror 194. Preferably, the hinged mirror is pivotable through at least 90° as shown in FIG. 16. In the embodiment shown in FIG. 16, the hinge member is a "living hinge," i.e., a polymeric member having one portion 198 adhered or otherwise secured to the back of the stationary mirror and another portion 200 adhered or otherwise secured to the back of the second or movable mirror. An intermediate portion 202, integral with portions 198 and 200, provides an integral flexing area enabling the second mirror to be swung away from the first mirror. The polymeric material is sufficiently flexible and resilient to enable the mirror to be pivoted a great many times without fatigue or failure. An integral portion 204 is provided on the portion 200 of the hinge element 196 in order to provide an anchoring area for a push-pull cable 206 which may be utilized to control the position of the movable mirror from the passenger compartment of a vehicle. As in the mirror assembly 160 described above, the back of the housing 191 is coated with a dark, light-absorbing, dull finish such that no light will be reflected therefrom when the mirror is pivoted out of the way into its night position. Therefore, it will be understood that the mirror assembly 190 provides a day-night mirror wherein the mirror is pivoted into a position flat against the stationary mirror 194 with the reflective coatings immediately adjacent one another for daytime use and is pivoted 90° upwardly out of the area behind the transparent area on the stationary mirror for nighttime use. A flexible, spring member 193 is secured within housing 191 to insure that mirror 192 is held tightly against the back of mirror 194. In this respect, the only reflection that will be encountered with the second mirror 192 pivoted upwardly will be the reflection from the surfaces of the transparent area of stationary mirror 194. Generally, such transparent surface areas reflect only approximately 4 per cent of the light incident thereon. The spring or biasing means 193 is provided in this embodiment to prevent the second mirror from vibrating or pivoting away from the rear surface of the stationary mirror 194 in its daytime position.

Figure 17:
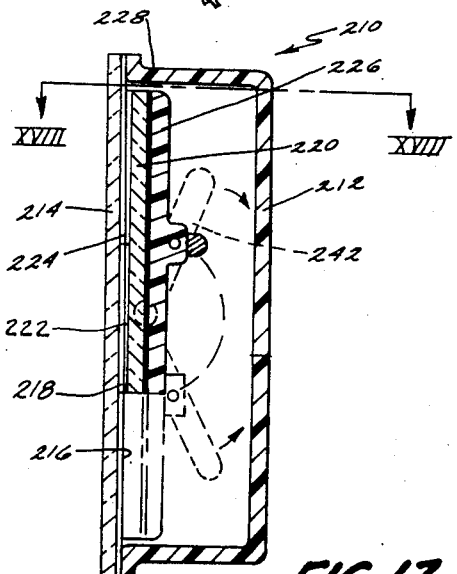
FIG. 17 is a cross-sectional, side elevation of another form of the present invention including a lever-operated pivot arm for movement of the second mirror.
Figure 18:
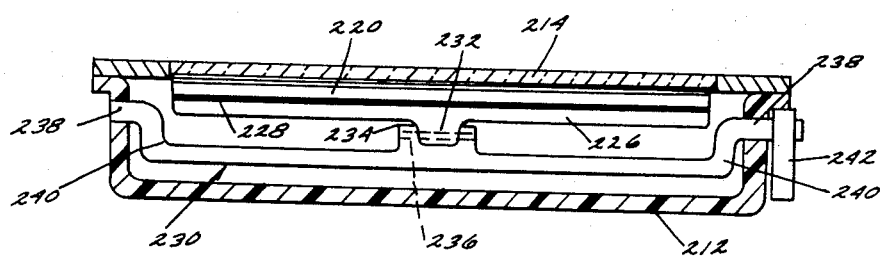
FIG. 18 is a cross-sectional, plan view of the mirror assembly of FIG. 17 taken along plane XVIII—XVIII thereof.

Referring now to FIGS. 17 and 18, yet another embodiment 210 of the mirror assembly is shown. Assembly 210 includes a housing 212 having a stationary mirror 214 secured thereto such that it covers the frontal opening thereof. Mirror 214 includes a reflective coating 216 on the rear surface thereof including a transparent area 218 forming a horizontal, central strip across the entire width of the mirror 214. A movable second mirror 220 is disposed behind the stationary mirror 214 and includes a reflective area 222 and a reduced-reflectivity area 224 each of which is sufficient to cover the entirety of the transparent area 218. The second mirror 220 is supported by a mirror-retaining element 226 with a pressure pad 228 formed from rubber or another similar material interposed therebetween. Movement between the day and night positions of the second mirror 220 is accomplished via a supporting lever or pivot arm 230. The pivot arm is secured to the mirror-retaining element 226 via raised areas 232 and 234 with a pivot pin 236 passed therethrough. The supporting lever arm 230 is pivotably supported on axial projections 238 received in apertures on the lateral sides of the housing 212. The axial portions 238 are coaxial and are offset from the main portion of supporting arm 230 via integral perpendicular areas 240. An actuating lever 242 is provided to pivot the arm between the day and night positions. An involute spring or other biasing means (not shown) may be included either internally or externally of housing 212 to bias arm 230, and thus element 226, into one or both of the day and night positions.

As will now be understood, the second mirror 220 may be pivoted between its day and night positions without the adjacent reflective and nonreflective coatings 222, 224, and 216 coming in contact merely by pivoting the supporting lever arm 230 via lever 242. The supporting lever arm 230 swings the second mirror element via the retaining member 226 such that either the reflective surface 222 or nonreflective surface 224 is brought into registry with the transparent area 218. A biasing means (not shown) may be provided to retain the second mirror 220 is either of its day or night positions.

Therefore, it will be understood that the embodiments shown in FIGS. 13 through 18 all provide means for selectively registering various portions of a movable second mirror with transparent areas of a stationary first mirror without causing the respective reflective or nonreflective coatings to come in contact with each other. In each of the embodiments, however, the second mirror is pressed flat against the mirror surface of the stationary first mirror in its registering position such that the reflective coatings are as closely adjacent one another as is possible. Biasing means are included to maintain the mirrors in this position. Thus, when each of the mirror assemblies described herein is viewed in its daytime position, the reflective surface will appear to be a continuous, uniformly coated, reflecting surface. The fact that it is composed of two separate reflective coatings on two separate mirror elements will be hardly noticeable.

In this connection, it will be noted that when a reflective coating is viewed through a transparent piece of glass, as in any of the mirror embodiments, the reflective surface will appear to be somewhat brighter. Presumably, this is due to the additional reflection caused by the transparent glass surfaces which are intermediate the reflective coating and the viewer's eyes. Therefore, in order to properly match the reflectiveness of the separate reflective coatings on the respective mirrors, the reflective coating on the second or movable mirror is dulled somewhat, or made somewhat less reflective, such that, when it is viewed through the transparent section of the first or stationary mirror, it will appear to have the same reflective quality or "brightness" as the reflective coating on the back of the stationary mirror.

As will be appreciated by those skilled in the art, the various control means shown in FIGS. 1–3 and 9–18 are but a few of the many available means for shifting the movable mirror with respect to the stationary mirror. Further, although the various assemblies have been described with reference to glass mirrors, other materials such as plastic may be effectively used in the invention.

Therefore, the anti-glare, day/night, rearview mirror provides an effective, simply constructed, durable mirror assembly which is extremely well-adapted for exterior use for preventing the glare from headlights and other undesirable lights from bothering the driver of a vehicle when using a rearview mirror. The mirror assembly may be provided with a single broad horizontal strip centered on the mirror surface for effectively reducing the glare from substantially all vehicle headlights to the rear of or passing the subject vehicle as well as a reflective surface including reduced-reflectivity areas spaced over the entirety thereof for reducing the entire reflectivity of the assembly. The assembly is easily shifted from its day-to-night positions or vice versa remotely from the interior of the vehicle by one of various means described herein or their equivalents thereby enabling the quick and convenient conversion of the mirror.

Reference to the term "silvered" at several places in the specification will be understood not to limit the invention to silver coatings for the formation of reflective surfaces on the various mirrors. Rather, many types of metallic or other types of reflective coatings may be used without deviating from the spirit of the invention.

While several forms of the invention have been shown and described, other forms will now be apparent to those skilled in the art. Therefore, it will be understood that the embodiments shown in the drawings and described above are merely for illustrative purposes and are not intended to limit the scope of the invention which is defined by the claims which follow.

The embodiments of the invention in which an exclusive property or priviledge is claimed are defined as follows.

1. A rearview mirror unit for vehicles comprising a first mirror having a reflective coating on its back or second surface, in combination with a second mirror having a reflective coating on its front or first surface; said mirrors being mounted adjacent one another with their reflecting surfaces immediately adjacent one another; said first mirror having at least one transparent area; said second mirror having at least one reduced-reflectivity area substantially corresponding in shape and size to said transparent area and at least one highly reflective area sufficiently large to cover said transparent area; one of said mirrors being movable with respect to the other such that said reduced-reflectivity and highly reflective areas are selectively registrable with said transparent area; said unit including means for moving said one mirror with respect to the other to move said reduced-reflectivity area out of registry with said transparent area and said highly reflective area into registry with said transparent area whereby said mirrors provide a highly reflective surface when said transparent and highly reflective areas are in registry and a partially reflective surface when said transparent and reduced reflectivity areas are in registry; said unit being mounted on a vehicle and for viewing by a driver thereof; said transparent area including a horizontal, transparent strip extending across the center of said second surface mirror; said reduced reflectivity area comprising a correspondingly shaped and sized blackened area; said areas being sufficiently wide to generally include the positions of all headlights on vehicles approaching from the rear of said vehicle thereby reducing the glare reflected by said mirror unit to the eyes of the driver.

2. A rearview mirror unit for vehicles comprising a first mirror having a reflective coating on its back or second surface, in combination with a second mirror having a reflective coating on its front or first surface; said mirrors being mounted adjacent one another with their reflecting surfaces immediately adjacent one another; said first mirror having at least one transparent area; said second mirror having at least one reduced-reflectivity area substantially corresponding in shape and size to said transparent area and at least one highly reflective area sufficiently large to cover said transparent area; said second mirror being movable with respect to the first such that said reduced-reflectivity and highly reflective areas are selectively registrable with said transparent area; said unit including means for moving said second mirror with respect to the first to move said reduced-reflectivity area out of registry with said transparent area and said highly reflective area into registry with said transparent area whereby said mirrors provide a highly reflective surface when said transparent and highly reflective areas are in registry and a partially reflective surface when said transparent and reduced reflectivity areas are in registry; said mirrors being mounted on the exterior of a vehicle in a housing having a generally rearwardly facing opening; said first mirror mounted so as to close and seal said opening; means for slidably mounting said second mirror generally transverse to said first mirror within said housing behind said first mirror while maintaining said second mirror generally parallel to said first mirror; said housing including track means formed therein for guiding said sliding movement to prevent abrasive contact between said reflective coatings during such movement.

3. The mirror unit of claim 2 wherein said unit is mounted on a vehicle and is viewable by a driver thereof; said first mirror including a plurality of horizontal, transparent strips alternating with horizontal highly reflective strips on said back surface of said first mirror; said second mirror including horizontal, blackened strips alternating with horizontal highly reflective strips on said front surface thereof, each of said blackened and highly reflective strips on said second mirror corresponding in size to said transparent strips.

4. The mirror unit of claim 2 wherein said unit is mounted on a vehicle and is viewable by a driver thereof; said first mirror including a plurality of transparent dots spaced regularly on the reflective back surface thereof; said second mirror including a corresponding number of correspondingly spaced, shaped, and sized blackened dots on its front reflective surface.

5. The mirror unit of claim 2 wherein said means for moving said second mirror comprise remote-control, flexible cable means adapted to slide said second mirror relative to said first mirror; said cable means being controllable from within said vehicle.

6. The mirror unit of claim 2 wherein said means comprise an electric solenoid means and electric control means therefor; said control means controllable from within said vehicle to actuate said solenoid means; said solenoid means adapted to slide said second mirror relative to said first mirror.

7. The mirror unit of claim 2 wherein said means comprise an electric motor and gear means and electric control means therefor; said control means controllable from within said vehicle to actuate said motor and gear means; said motor and gear means adapted to slide said second mirror relative to said first mirror.

8. The mirror unit of claim 2 wherein said track means comprise channels in said housing for guiding camming means adapted to slide said second mirror in an arcuate path relative to said first mirror while said second mirror is maintained generally parallel to said first mirror; said camming means including means controllable from within said vehicle for actuating said sliding of said second mirror.

9. The mirror unit of claim 2 wherein thin, nylon bearing means are disposed between said first and second mirrors for slightly spacing apart said mirrors and preventing said respective reflective surfaces from coming in contact with one another.

10. The mirror unit of claim 2 wherein one of said mirror reflective surfaces includes a thin, transparent coating of a lubricious material covering at least a portion thereof for lubricating the movement between said mirrors and for preventing said reflecting surfaces from wearing away.

11. The mirror unit of claim 10 wherein said coating covers only the reduced-reflectivity areas of said front surface of said second mirror.

12. The mirror unit of claim 10 wherein said coating covers only the highly reflective areas of said back surface of said first mirror.

13. The mirror unit of claim 7 wherein said track means comprise channels in said housing for guiding said second mirror toward and away from said first mirror at an acute angle to said first mirror while said second mirror is maintained generally parallel to said first mirror; said camming means including means controllable from within said vehicle for actuating said sliding of said second mirror.

14. A day/night rearview mirror assembly for vehicles; said assembly being adjustable between a day position in which said assembly has a specified first reflectivity and a night position in which said assembly has a second reflectivity less than said first reflectivity; said assembly comprising in combination: first and second mirrors having reflective surfaces; said first mirror including at least one transparent area within its reflective surface through which light incident on said first mirror passes to said second mirror; said second mirror including at least one reduced-reflectivity area within its reflective surface, said reduced-reflectivity area corresponding in shape, size, and number to said transparent area; said second mirror being movably mounted with respect to said first mirror; and control means for moving said second mirror relative to said first mirror such that said transparent and reduced-reflectivity areas may be brought selectively into and out of registry in order to provide said first and second reflectivities respectively; said transparent and reduced-reflectivity areas each comprising a single horizontal strip extending centrally across said respective mirrors; said strip being of sufficient width and reflective quality to reduce the glare from lights from vehicles approaching the vehicle on which said assembly is mounted when said assembly has said second reflectivity.

15. A rearview mirror unit for vehicles comprising a first mirror having a reflective coating on its back or second surface, in combination with a second mirror having a reflective coating on its front or first surface; said mirrors being mounted adjacent one another with their reflecting surfaces immediately adjacent one another; said first mirror having at least one transparent area; said second mirror having at least one reflective area substantially corresponding in shape and size to said transparent area and having a predetermined reflective quality; said second mirror being movable with respect to said first mirror such that said reflective area of said second mirror is selectively registrable with said transparent area; said unit including means for moving said second mirror with respect to said first mirror to move said reflective area of said second mirror into and out of registry with said transparent area whereby said mirrors provide a highly reflective surface when said transparent and reflective areas are in registry and a partially reflective surface when said transparent and reflective areas are not in registry, said unit further including fixed means positioned between said first and second mirrors for preventing abrasive contact between the reflective coatings on said mirrors and means for biasing said second mirror toward said first mirror to hold said reflective coatings adjacent each other.

16. The mirror unit of claim 15 wherein said means for moving said one mirror include hinge means for pivoting said second mirror out of registry with said first mirror and means for controlling the pivotal movement of said second mirror.

17. The mirror unit of claim 15 wherein said unit includes a housing surrounding at least said second mirror; said means for moving said second mirror include camming means having track means for governing the movement of said second mirror and backing support means for said second mirror for engaging said track means; said track means formed integrally within said housing.

18. The mirror unit of claim 17 wherein said track means is arcuate.

19. The mirror unit of claim 17 wherein said track means is rectilinear.

20. The mirror unit of claim 15 wherein said means for moving said one mirror includes a pivotal support arm including means for pivotally supporting said second mirror on said arm; said second mirror also including at least one reduced-reflectivity area substantially corresponding in shape and size to said transparent area; said pivot arm providing means for moving said second mirror in an arcuate path while said second mirror remains generally parallel to said first mirror for selectively registering said reflective and reducedreflectivity areas with said transparent area; said movement occurring without abrasive contact between said reflective coatings on said respective mirrors.

21. The mirror unit of claim 15 wherein said second mirror is movable; said means for moving said second mirror including a mirror-retaining member supporting said second mirror and an intermediate resilient pad between said second mirror and retaining member; said resilient pad allowing said second mirror to be brought into contact with and pressed flat against said first mirror by said retaining member.

* * * * *